Patented Mar. 15, 1932

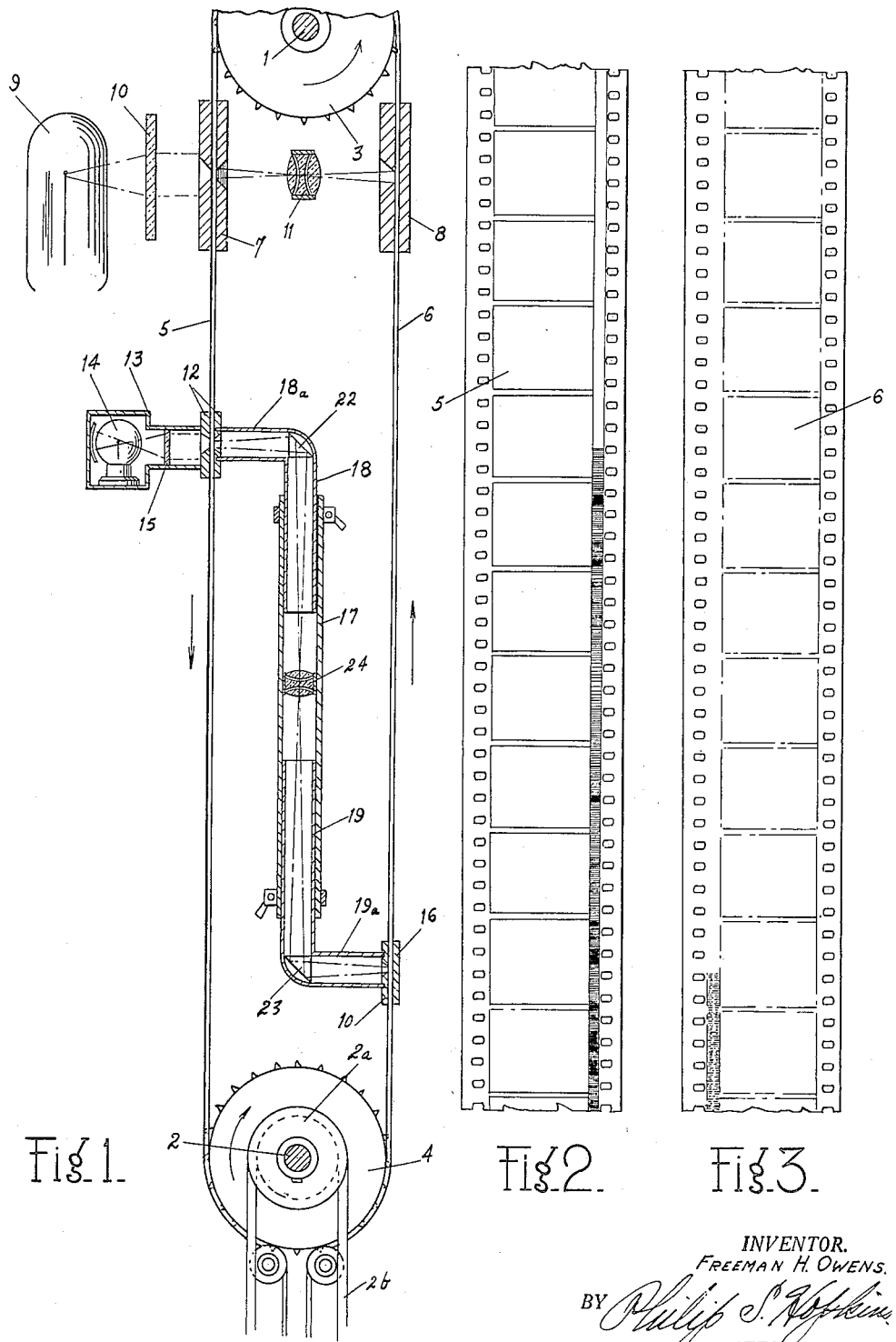

1,849,549

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

OPTICAL PRINTING APPARATUS

Application filed July 9, 1930. Serial No. 466,726.

This invention relates to improvements in optical printing apparatus, the principal object of the invention being to provide a comparatively simple device of this character by means of which picture images and an appropriate sound record may be directly transferred from a negative to a positive film in such a manner that on the positive film the sound record will occupy a position relative to the picture images different from that which it occupied on the negative film.

In the photographing of sound records on a film together with picture images, the sounds appropriate to the respective images appear on the film at a distance of approximately seven and a half inches from such images, while for the purposes of the reproducing projector it is necessary that the sound record appear at a distance of approximately fourteen and one half inches from its appropriate picture images. The object of the present invention, therefore, is to provide an apparatus by means of which the difference between the relative positions of the picture images and sound record on the negative film and the desired relative positions on the positive film can be compensated for while printing both the picture images and sound record directly from the negative to the positive.

Other objects and advantages of the invention will appear as the description proceeds.

Figure 1 is a diagrammatic sectional side view of an apparatus embodying the features of the present invention; and Figures 2 and 3 are plan views of portions of films, illustrating the different relative positions occupied by the picture images and sound record on the negative and positive films respectively.

Referring to the drawings, 1 and 2 designate a pair of shafts mounted at points a suitable distance apart, means, such as the pulley 2a and belt 2b being provided on the lower shaft 2 for rotating said shaft. On each of the shafts is secured a sprocket 3 and 4 respectively adapted to engage at diametrically opposite sides of said sprockets, a negative film 5 and a positive film 6, whereby said films are spaced apart in parallel relation and caused to travel in opposite directions as indicated by the arrows in Figure 1. The films engaging the upper sprocket 3 causes the rotation thereof and of the shaft 1.

At a suitable point between the two sprockets is disposed the picture printing station, which comprises a pair of film gates 7 and 8 in alignment with each other, and through which are guided the negative and positive films respectively. A printing lamp 9 is supported in position to project its rays through the negative film gate, a suitable diffusing screen or glass 10 being disposed between said lamp and gate, and the usual lens 11 mounted between the gates 7 and 8 for focusing the picture images on the positive film.

A second negative film gate 12 is mounted at the proper distance from the gate 7 to correspond with the relative positions of the picture images and sound record on the negative film, a suitable housing 13 in which is mounted a printing lamp 14 and a diffusing screen 15 being mounted in position to project light through said gate. In the path of the positive film is also mounted a second film gate 16, said gate being adapted to suport the positive film at the proper distance from the gate 8, to correspond with the desired relative positions of the picture images and sound record on the positive film. For transmitting the sound record from the negative film gate 12 to the positive film gate 16, a tubular housing or sleeve 17 is provided, in the opposite ends of which are telescopically mounted a pair of L-shaped tubes 18 and 19 respectively, the angular end portions 18a and 19a of which are turned in opposite directions and at their free ends communicate respectively with the gates 12 and 16. The tubes 18 and 19 are secured in the sleeve 17 by clamping means 20 and 21 whereby the overall length of the sleeve and tubes may be adjusted to meet variations in the desired position of the sound record on the positive film. Within the tubular members 18 and 19, at the angles formed by the intersection of said members with their end portions 18a and 19a are mounted a pair of prisms 22 and 23, each so disposed as to receive light and deflect it at right angles to the path of reception, a lens 24 being mounted in the sleeve 17 between said prisms for focusing light on the prism 23.

In the operation of the apparatus, the films having been threaded through the gates and over the sprockets in the manner indicated in Figure 1, motion is then imparted to the shaft 2 and the circuits through the printing lamps closed, whereupon the picture images and the sound record will be transferred to the positive film at the gates 8 and 16 respectively said gates being located at a considerably greater distance apart than the gates 7 and 12, so that the picture images will be printed on the positive film a correspondingly greater distance in advance of the sound record than the distance between their respective positions on the negative film. It will be understood, of course, that when the positive film is passing through the gate 16, only its sound record area will be exposed to the rays of light projected through the negative film from the lamp 14, and when it is passing through gate 8 only its picture image area is exposed to the rays from lamp 9.

Of course, changes may be made in construction and arrangement of parts without departing from the spirit and scope of my invention. I do not limit myself, therefore, to the exact structure herein shown and described, other than by the appended claims.

I claim:

1. An optical printing apparatus, comprising a pair of separated film gates adapted to support a traveling film carrying picture images and a sound record, a pair of separated film gates adapted to support a sensitized film in parallel relation to said first named film, one gate of said second pair being in alignment with a gate of the first pair, the gates of said second pair being spaced a greater distance apart than the gates of the first pair, means for projecting the picture images from said first named film to said sensitized film as the films pass through said aligned gates respectively, and means for projecting the sound record from the first named to the sensitized film as said films pass through the remaining gates.

2. An optical printing apparatus, comprising a pair of separated film gates adapted to support a traveling film carrying picture images and a sound record, a pair of separated film gates adapted to support a sensitized film in parallel relation to said first named film, one gate of said second pair being in alignment with a gate of the first pair, the gates of said second pair being spaced a greater distance apart than the gates of the first pair whereby the remaining gates of the two pairs are out of alignment, means for projecting the picture images from said first named film to said sensitized film as the films pass through said aligned gates respectively, an enclosed housing communicating with said unaligned gates, and means in said housing for receiving the sound record from the first named film and deflecting it on the sensitized film as said films pass through said unaligned gates.

3. An optical printing apparatus, comprising a pair of separated film gates adapted to support a traveling film carrying picture images and a sound record, a pair of separated film gates adapted to support a sensitized film in parallel relation to said first named film, one gate of said second pair being in alignment with a gate of the first pair, the gates of said second pair being spaced a greater distance apart than the gates of the first pair whereby the remaining gates of the two pairs are out of alignment, means for projecting the picture images from said first named film to said sensitized film as the films pass through said aligned gates respectively, a tubular housing disposed between said unaligned gates in parallel relation to said films, said housing having angular portions at its opposite ends communicating with said unaligned gates respectively, and a pair of deflecting members disposed in said housing at its intersections with said angular portions, said members being adapted successively to receive the sound record projected from the first named film as it passes through its unaligned gate and deflect said record at right angles to its path of reception thereby to transmit the record to the sensitized film as it passes through its unaligned gate.

4. An optical printing apparatus, comprising a pair of separated film gates adapted to support a traveling film carrying picture images and a sound record, a pair of separated film gates adapted to support a sensitized film in parallel relation to said first named film, one gate of said second pair being in alignment with a gate of the first pair, the gates of said second pair being spaced a greater distance apart than the gates of the first pair whereby the remaining gates of the two pairs are out of alignment, means for projecting the picture images from said first named film to said sensitized film as the films pass through said aligned gates respectively, a tubular housing disposed between said unaligned gates in parallel relation to said films, angular portions adjustably secured to said housing at its opposite end and communicating respectively with said unaligned gates.

In testimony whereof, I affix my signature.

FREEMAN H. OWENS.